United States Patent [19]
Hattori et al.

[11] Patent Number: 5,665,285
[45] Date of Patent: Sep. 9, 1997

[54] METHOD FOR PRODUCING A MOLDED FOAM ARTICLE WITH AN INTEGRAL SKIN

[75] Inventors: Kazuhide Hattori; Hiroyuki Yamaji, both of Yokkaichi; Yoshikazu Hatakeyama; Yoshiyuki Shida, both of Sanjo; Atsushi Tamura, Shinagawa; Takumi Kitaoka, Shinagawa; Takashi Kohama, Shinagawa, all of Japan

[73] Assignees: Mitsubishi Yuka Badische Co., Ltd., Mie-ken; Sanko Sogyo Co., Ltd., Niigata-ken; Aron Kasei Co., Ltd., Osaka-fu, all of Japan

[21] Appl. No.: 377,157

[22] Filed: Jan. 24, 1995

[51] Int. Cl.$^6$ .............................. B29C 44/06; B29C 44/18
[52] U.S. Cl. ...................... 264/45.4; 264/46.6; 264/126; 264/155; 264/161; 264/510; 264/536
[58] Field of Search ........................ 264/154, 536, 264/155, 45.4, 46.6, 510, 161, 126; 425/535, 536

[56] References Cited

U.S. PATENT DOCUMENTS

| | | | |
|---|---|---|---|
| 4,070,429 | 1/1978 | Uhlig | 264/154 |
| 4,323,411 | 4/1982 | Uhlig | 264/430 |
| 4,546,899 | 10/1985 | Williams | 264/46.6 |
| 5,100,607 | 3/1992 | Robbins, III | 264/154 |
| 5,104,472 | 4/1992 | Kasugai et al. | 264/155 |
| 5,366,674 | 11/1994 | Hattori et al. | 264/45.4 |

FOREIGN PATENT DOCUMENTS

| | | |
|---|---|---|
| 42-10752 | 6/1967 | Japan . |
| 58-10217 | 2/1983 | Japan . |
| 58-116135 | 7/1983 | Japan . |
| 62-9073 | 3/1987 | Japan . |
| 3-56905 | 8/1991 | Japan . |
| 3-293113 | 12/1991 | Japan . |
| 5-138722 | 6/1993 | Japan . |

*Primary Examiner*—Allan R. Kuhns
*Attorney, Agent, or Firm*—Millen, White, Zelano, & Branigan, P.C.

[57] ABSTRACT

A molded foam article with an integral skin is produced by blow-molding a parison in a cavity of a metal mold to form a hollow member, filling the hollow member with pre-expanded thermoplastic resin besides before cooling and solidification of the hollow member, and heating the pre-expanded beads to cause the beads to expand further and fuse together. A filler for the pre-expanded thermoplastic resin beads is provided with a cutter for making a hole in the hollow member before introducing the resin beads into the hollow member.

4 Claims, 8 Drawing Sheets

METHOD FOR PRODUCING A MOLDED FOAM ARTICLE WITH AN INTEGRAL SKIN

TECHNICAL FIELD

This invention relates to a novel method and apparatus for producing a molded foam article equipped with an integral skin.

BACKGROUND ART

It is well known that molded plastic foams (briefly, molded foams) are generally produced by one of the two basic techniques, namely a molding method employing expandable resin beads (for example, expandable polystyrene) and a molding method employing a liquid foaming material (for example, forming polyurethane). The former molding method, alias "in-mold foaming", comprises filling a metal mold with pre-expanded resin beads and introducing hot steam into the beads to cause the beads to expand further and thermally fuse together (See JP Publication H-3-56905).

Meanwhile, molded thermoplastic resin foams are known which have an integral outer skin of increased density (See JP Publication S-42-10752). They are produced by a process comprising the steps of blow-molding a skin-forming non-foamable parison in a blow-molding metal mold, cooling and allowing the molded parison to form a hollow member, taking it out from the mold, filling the hollow member with pre-expanded resin beads (hereinafter also referred to as "pre-expanded beads"), inserting a hot steam blowing pipe, feeding hot steam through the pipe to heat the pre-expanded beads for further expansion, and withdrawing the blowing pipe before the complete mutual fusion of the beads to occur to thereby provide a molded foam having a skin (See JP Publication S-62-19239, JP Publication S-58-10217 and J Utility Model Publication S-62-9073).

However, since this process includes two separate molding steps, namely one for molding a hollow member and one for molding a molded foam in the hollow parison, separate sets of apparatus including a metal molds are required, and, therefore, the whole producing process is complicated. Particularly, the cooling and solidification time required for the hollow member and the time required for mutual fusion of the pre-expanded beads and cooling and solidification thereof add up to a substantial length of time and, therefore, the productivity of the process is inevitably low. Furthermore, since the pre-expanded beads are introduced into the cooled hollow member, the bond between the hollow member and molded foam is insufficient.

To overcome these disadvantages, a method has been proposed which comprises pouring an urethane or other reactive foamable liquid material into the parison set in a closed blow-molding metal mold to bring the parison into intimate contact with the inside wall of the metal mold and causing the foamable liquid material to react and cure concurrently with the cooling and solidification of the parison under clamped condition (See JP Kokai S-58-116135 and JP Kokai H-3-293113).

However, because in this method the pressure required to cause the parison to conform to the inner wall of the blow-molding metal mold comes from from the pressure generated by the foaming of the foamable material, the method has a disadvantage that the pressure acting on the parison tends to be insufficient so that, particularly when the geometry of the inner wall is complicated, the parison cannot be fully brought into contact with the internal surfaces of the mold and the distribution of the degree of expansion of the parison is also found uneven.

Under the circumstances the inventors previously proposed a method for minimizing the molding cycle time by integrating an ordinary metal mold for blow-molding and a metal mold for in-mold foaming into one and the same mold, which method comprises blow-molding a parison in usual manner, feeding pre-expanded beads into the resulting hollow member, and heating the beads to cause further expansion and mutual fusion (JP Application H-3-252111).

Thus, in this method a pre-expanded bead filler is disposed in a retractable manner on the parting line of the blow-molding metal mold and a parison is blow-molded to form a hollow member while retaining the filler projected inwardly with respect to the internal surface of the mold, and then pre-expanded beads are introduced from the filler into the internal cavity of the hollow member. In this arrangement, the position of the filler is restricted to the parting line of the mold because it is difficult to make a filling hole in the hollow member with the filler and, therefore, the method cannot be applied to a large-sized or hinged product or in molding using a multi-cavity mold.

DISCLOSURE OF INVENTION

In one aspect, this invention provides, a method of producing a molded foam article with an integral skin which comprises blow-molding a parison suspended in a blow-molding metal mold to form a hollow member, filling the cavity of the hollow member with pre-expanded thermoplastic resin beads before cooling and solidification of the hollow member, and heating said beads to cause further expansion and mutual fusion to form a molded foam, characterized in that a filling hole is bored in the hollow member immediately before the bead filling and the beads are then introduced through the filling hole.

In another aspect, this invention provides an apparatus for producing a molded foam article with an integral skin which comprises an openable blow-molding metal mold equipped with an overhead parison extruder, blow-molding air and hot steam supply means, and a filling means for pre-expanded resin beads, characterized in that a drivable cutter for making a hole in the blow-molded is disposed at the forward end of said filling means.

DETAILED DESCRIPTION OF THE INVENTION

Figure 1:
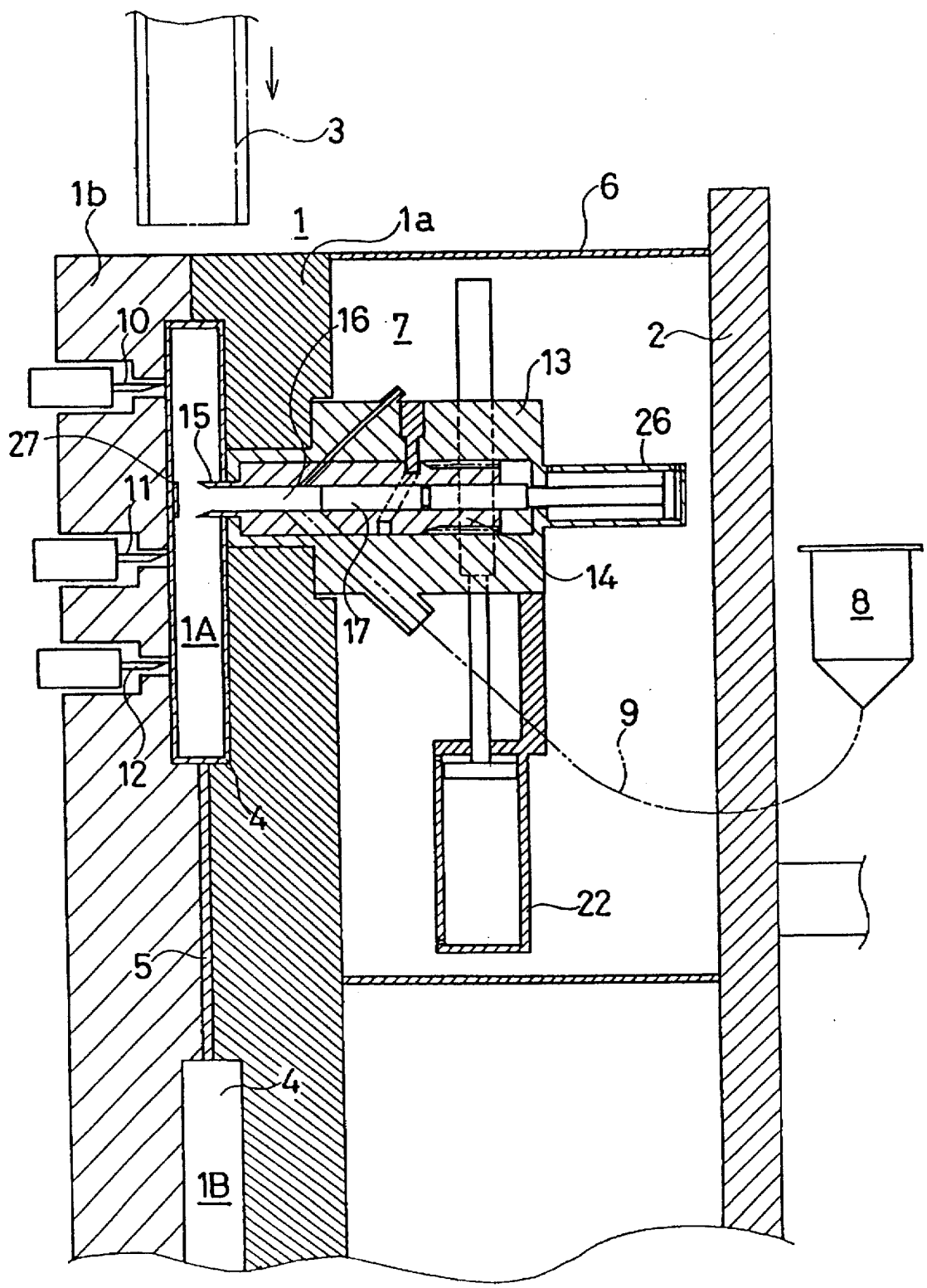
FIG. 1 is a sectional elevational view showing the molding apparatus for producing a molded foam with an integral skin in accordance with this invention.

Referring to FIG. 1, a blow-molding metal mold consisting of a pair of mold segments is shown generally at 1. This blow-molding metal mold 1 is used for the production of a molded foam with an integral skin as hereinafter described in detail.

The blow-molding metal mold segments, 1a and 1b, are supported by a pair of mounting plates 2, respectively, so that they may be opened and closed with respect to each other (only one of the the plates is shown).

Disposed over this blow-molding metal mold 1 is a parison extruder (not shown) so that the extruder heats and melts the resin and feeds the resin in the form of a parison 3 into the blow-molding metal mold 1.

The blow-molding metal mold 1 is provided with a couple of cavities, 1A, and 1B, disposed in parallel at different levels so that a couple of units of a hollow member 4 can be molded simultaneously. These hollow members 4 are interconnected via a connecting part 5 which is either used as a hinge portion of the article or cut for providing two discrete hollow members.

One mold segment 1a of said blow-molding metal mold 1 is integral with said mounting plate 2 through a spacer means 6 and a filler 7 for feeding pre-expanded beads, which is described hereinafter, is disposed in the space defined by said spacer means 6. The filler 7 is in communication with a beads storage tank 8 located externally of the metal mold through flexible piping 9.

The other mold segment 1b of this blow-molding metal mold 1 is equipped with a blow air nozzle pin 10, a hot steam nozzle pin 11 and a vacuum line nozzle pin 12. Each of these nozzle pins 10, 11, and 12 has a slit on its barrel and has a pointed end so that it can be easily inserted into the hollow member 4. Moreover, though not shown, these nozzle pins 10, 11 and 12 are respectively provided with drive means for insertion and withdrawal of the pins. Though these nozzle pins 10, 11 and 12 are independent elements in the embodiment shown in FIG. 1, it can be so arranged that one and the same nozzle pin performs the functions of the three pins.

The molding method employing the above apparatus is now described. The blow-molding metal mold 1 in its open position is fed a thermally melted parison 3 (e.g., at 180°–220° C. for polypropylene resin or 160°–200° C. for polyethylene resin). At this stage, the metal hold 1 is maintained at 40°–80° C. Of course, the metal mold 1 may be held at ambient temperature.

The metal mold 1 is then clamped to seal the parison 3 and the blow air nozzle pin 10 is inserted to introduce air into the parison 3 at 2–7 kg/cm² (gauge) for 1.0–20 seconds, whereupon the parison 3 is expanded to form a hollow member 4.

In the course of subsequent cooling of the hollow member 4, it is filled with pre-expanded beads by means of a filler 7 which is described in detail below.

The efficiency of this filling operation can be increased by inserting the vacuum nozzle pin 12 into the hollow member 4 to establish a vacuum of 300–760 mmHg within the hollow member 4 or by equipping the beads storage tank 8 with a compression device (not shown) to thereby apply a pressure of 0.5–6.0 kg/cm² (gauge), preferably 1.0–4.0 kg/cm² (gauge), to the pre-expanded beads.

Then, the hot steam nozzle pin 11 is inserted into the hollow member 4 to blow hot steam at 0.1–1.2 kg/cm² or 100°–125° C., preferably 0.8–1.0 kg/cm² or 115°–120° C., for 2–20 seconds, whereby the pre-expanded beads are caused to further expand and fuse one another to form a molded foam. In this operation, the flow of hot steam may be rectified by applying a suction force from the vacuum nozzle pin 12. This procedure will assist in obtaining an improved heating efficiency.

Thereafter, the molded foam with an integral skin is cooled in situ and the mold 1 is opened to take out the product.

Thus, the molded foam with an integral skin according to this embodiment of the invention consists of a skin 4 made of polyolefin resin (e.g. polyethylene, polypropylene, etc.), polystyrene resin, polyvinylchloride resin, ABS resin or the like and a foam core made of thermally fused pre-expanded resin beads of polystyrene, polyethylene or the like resin having diameters within the range of about 1–3 mm.

The pre-expanded bead filler 7 of the apparatus according to this embodiment is now described with reference to FIGS. 2 through 5. The filler 7 generally comprises a rotary cutter spindle 14, a rotary cutter 15 mounted at the forward end of said rotary cutter spindle 14, a cylinder 16 formed in the rotary cutter spindle 14, and a plunger 17 passed into said cylinder 16.

The filler body 13 is installed adjacent to the cavity 1A of one metal mold segment 1A and the rotary cutter spindle 14 is connected to the filler body 13 in such a manner that it is free to turn and move forward and backward.

The forward end (closer to the cavity) off his rotary cutter spindle 14 is fitted with the rotary cutter 15 which is cylindrical in profile and consisting of four saw-edge members. The diameter of this rotary cutter 15 is about 10–20 mm so that the pre-expanded beads can be introduced without hindrance through the hole bored with this rotary cutter 15 in the hollow member 4.

The axial bore of said rotary cutter spindle 14 constitutes the cylinder 16.

In the cylinder 16, the plunger 17 is disposed in such a manner that it can freely move forward and backward. The plunger 17 is adapted to push both the chip of the hollow member 4 which remains in the rotary cutter 15 and the pre-expanded beads remaining in the cylinder 16 into the hollow member 4.

The above cylinder 16 has a couple of openings disposed in opposed relation and communicating with a pre-expanded bead supply line 18 and air supply line 19 for pressure-feed of pre-expanded beads, respectively. On the other hand, the plunger 17 is provided on its with a circumference a annular groove 17a so that said openings are brought into communication with each other when the plunger 17 has advanced to the advancing end position.

The pre-expanded bead supply line 18 is disposed to be inclined relative to the axis with its discharging end oriented generally toward the outlet side of the cylinder. The line 18 consists of a first bore 18A formed in the rotary cutter spindle 14 and a second bore 18B formed in the filler body 13. The second bore 18B is connected to said flexible piping 9 for communication with said beads storage tank 8.

The air supply line 19 for pressure-feed of pre-expanded beads is also disposed to be inclined relative to the axis with its discharging end oriented generally toward the outlet side of the cylinder. The line 19 consists of a third bore 19A formed in the rotary cutter spindle 14 and a fourth bore 19B formed in the filler body 13. This fourth bore 19B is connected to an air source not shown.

The opening and closing of the pre-expanded bead supply line 18 and the air supply line 19 for pressure-feed of pre-expanded beads are effected by the forward and backward movement of said rotary cutter spindle 14 and said plunger 17. The bores 18A and 18B as well as the bores 19A and 19B are brought into communication only when the rotary cutter spindle 14 has advanced to the forward end position.

The driving mechanism for the above members is now described.

The base portion (farther from the cavity) of said rotary cutter spindle 14 is formed with a pinion gear 20 which is in mesh with a rack gear 21. The rack gear 21 is driven by a first air cylinder 22. The first air cylinder 22 comprises a reciprocating cylinder connected to the filler body 13 through a bracket 23.

Formed on the circumferential wall in an intermediate position of said rotary cutter spindle 14 is a guiding bevel groove 24 in which a guide pin 25 fixed to the filler body 13 is received.

Therefore, as the first air cylinder 22 is driven, the rack gear 21 is moved in association therewith, the pinion gear 20 turns in normal or reverse directions, with the result that the rotary cutter spindle 14, under the guidance of said guide pin 25, is advanced or retracted while it turns in normal and reverse directions, respectively.

Connected to the base (farther to the cavity) of the plunger 17 is a second air cylinder 26. The second air cylinder 26 comprises a reciprocating cylinder directly affixed to the filler body 13 perpendicularly to said first air cylinder 22.

Therefore, as the second air cylinder 26 is driven, the plunger 17 is advanced or retracted within the cylinder 16.

The operation of the above pre-expanded bead filler 7 is now described.

Figure 2A:
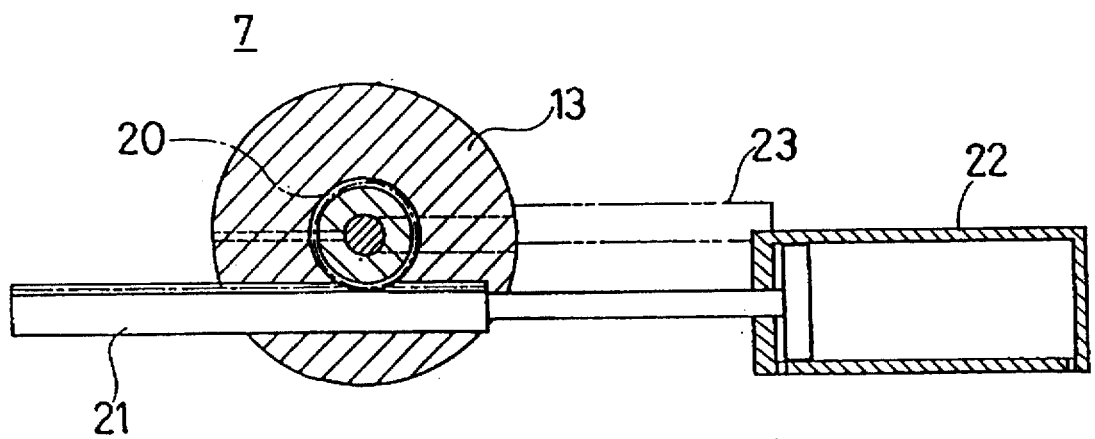
FIG. 2A is an end view in partial section of the filling means of the apparatus shown in FIG. 1.
Figure 2B:
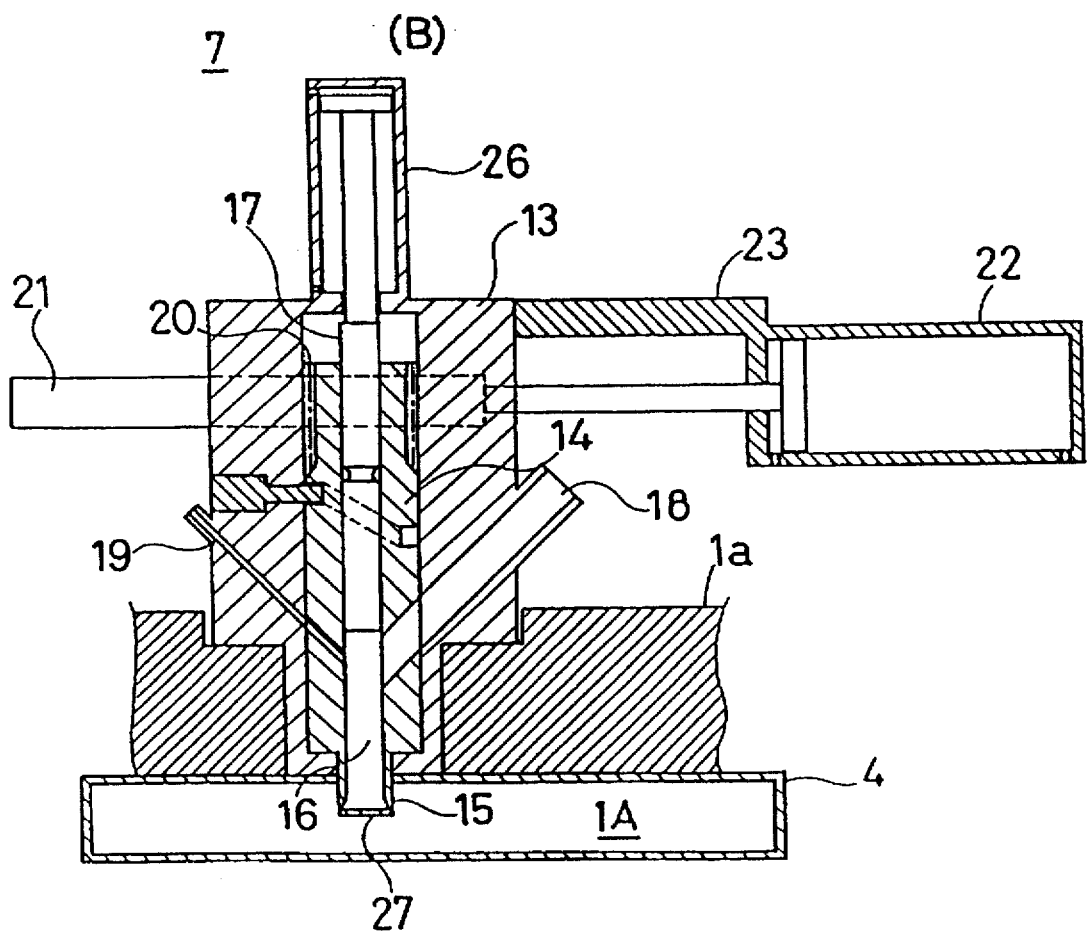
FIG. 2B is a cross-sectional view showing the filling means of the apparatus shown in FIG. 1.

When the parison 3 has been blow-molded to form the hollow member 4, the first air cylinder 22 is driven in a forward direction, so that the first air cylinder 22, rack gear 21, pinion gear 20 and rotary cutter spindle 14 are respectively driven in a sequence. This rotary cutter spindle 14 advances as it revolves through 270° under the guidance of said guide pin 25 received in the bevel groove 24 and as a result, the rotary cutter 15 dips into the hollow member 4 to make a filling hole (FIG. 2).

Then, as the first air cylinder 22 is driven in the reverse direction, the rotary cutter spindle 14 is retracted and the rotary cutter 15 returns to its initial position.

Figure 3:
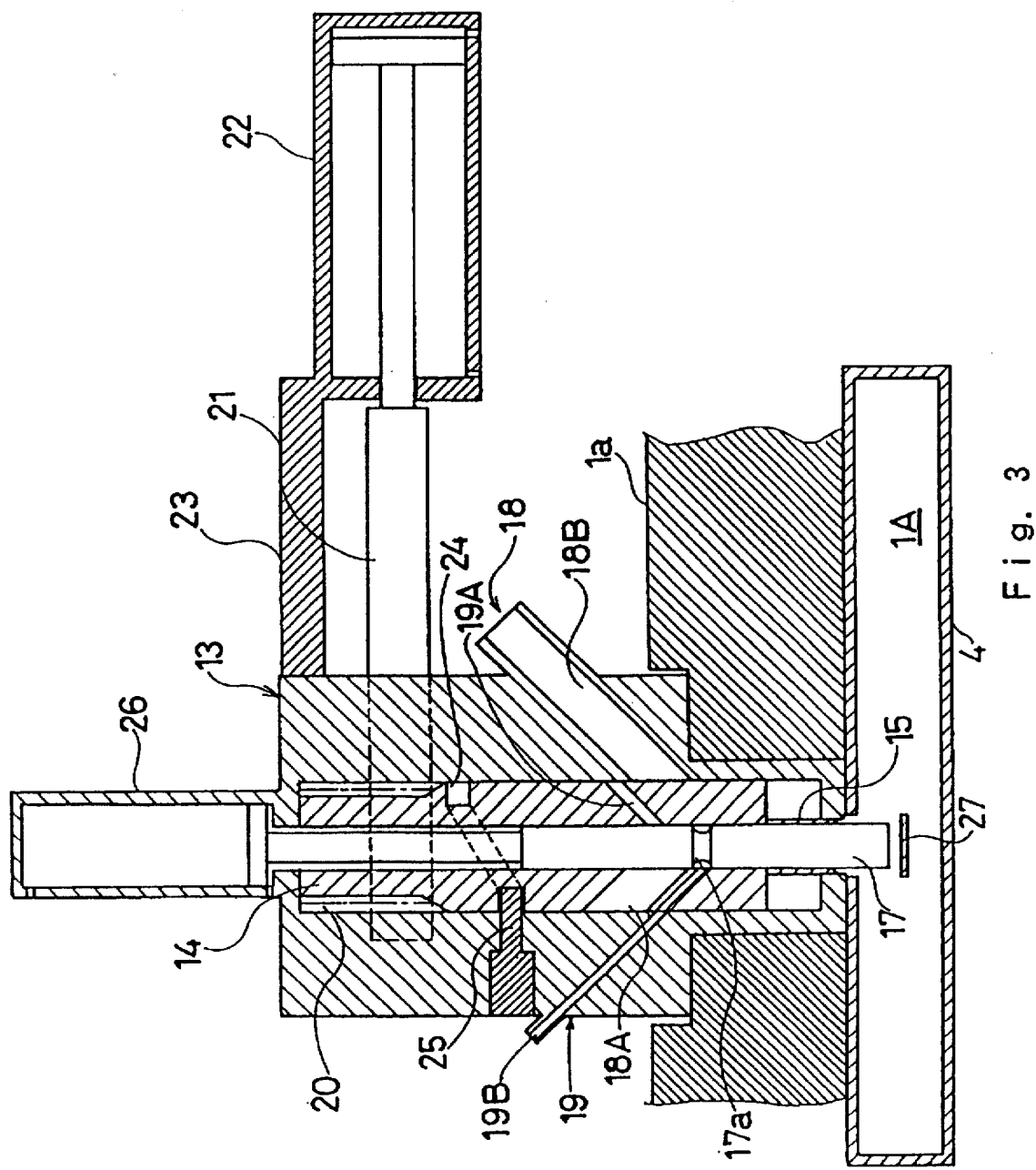
FIGS. 3–5 are cross-sectional views of the filling means of the apparatus shown in FIG. 1 in different operating positions of the means.

Then, as the second air cylinder 26 is driven in the forward direction, the plunger 17 advances to eject the disk-shaped chip 27 attached to the rotary cutter 15 into the hollow member 4 (FIG. 3).

Then, as the second air cylinder 26 is driven in the reverse direction, the plunger 17 returns to its initial position, viz. the backward end position.

Figure 4:
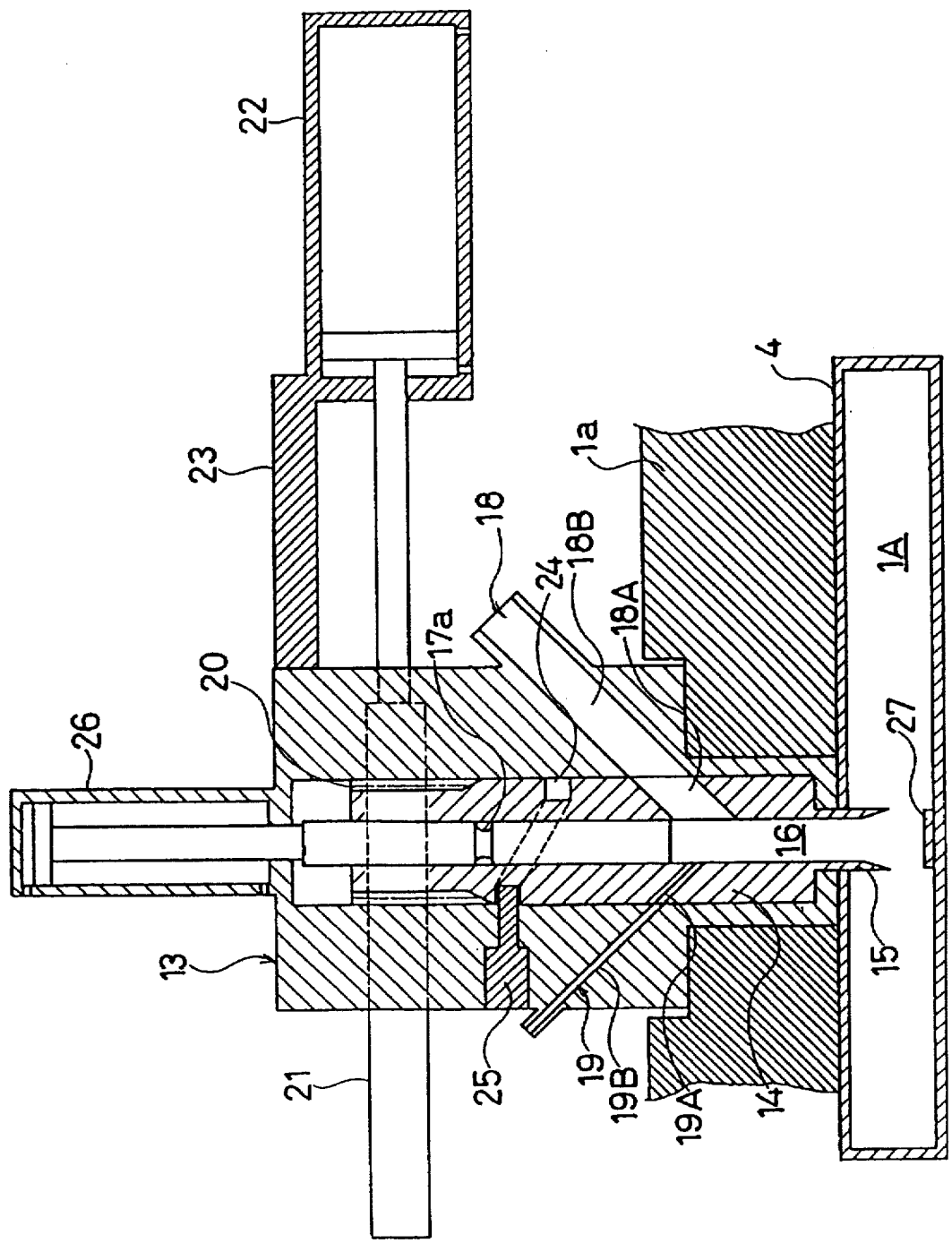
Figure 5:
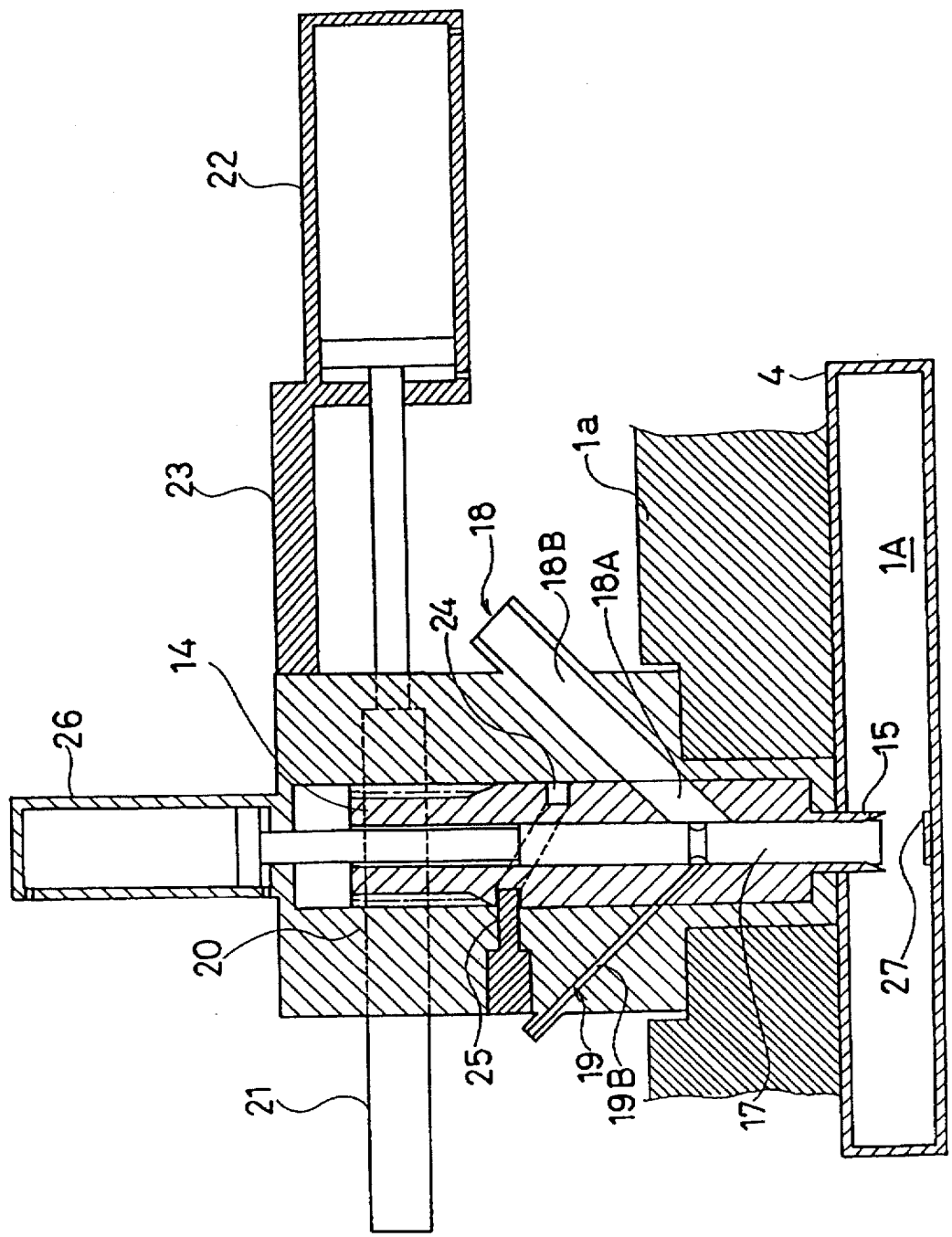

Then, as the first air cylinder 22 is driven again in the forward direction, the rotary cutter spindle 14 advances to the advancing end position. As a result, the pre-expanded bead supply line 18 and the air supply line 19 for pressure-feed of the pre-expanded beads are opened with their corresponding bores 18A/18B and 19A/19B aligned respectively into communication with each other so that the pre-expanded beads are pressure-fed into the hollow member 4 (FIG. 4).

Then, as the second air cylinder 26 is driven again in the forward direction, the plunger 17 advances so that the pre-expanded beads in the cylinder 16 and rotary cutter 15 are forced into the hollow member 4 and, at the same time, the respective openings of the pre-expanded bead supply line 18 and pressure-feed air supply line 19 are closed. When the plunger 17 has advanced to the advancing end position, said openings are again brought into communication through the plunger groove 17a so that the pre-expanded beads in the pre-expanded bead supply line 18 and flexible piping 9 are returned to the beads storage tank 8 by the pressurized air from the pressure-feed air line 19.

Any remaining pre-expanded beads in the cylinder 16 and pre-expanded bead supply line 18 would cause the trouble that such remaining beads would be heated and mutually fuse by the inflow of hot steam.

The filling hole made in the hollow member 4 by the rotary cutter 15 is plugged with a resin cap after removal of the product.

The boring operation in this embodiment is performed with the rotary cutter 15 mounted or formed at the forward end of the rotary cutter spindle 14. However, this invention is not limited to this arrangement. Thus, for example, a drill (a conventional drill for plastics which has a cutout channel for collection of chips) may attached to the forward end of the plunger 17 and driven in association with the rotation of the plunger 17. In this arrangement, the rotary cutter spindle 14 and second air cylinder 26 may be omitted. The system including such a drill is also subsumed in the category of drivable cutter.

Moreover, when the bead storage tank 8 is provided with a pressurizing means to pressure-feed the pre-expanded beads through the bead supply line 18, said air supply line 19 may be used exclusively for the return of pre-expanded beads remaining in the bead supply line 18 without being used as a feeding means.

Figure 6:
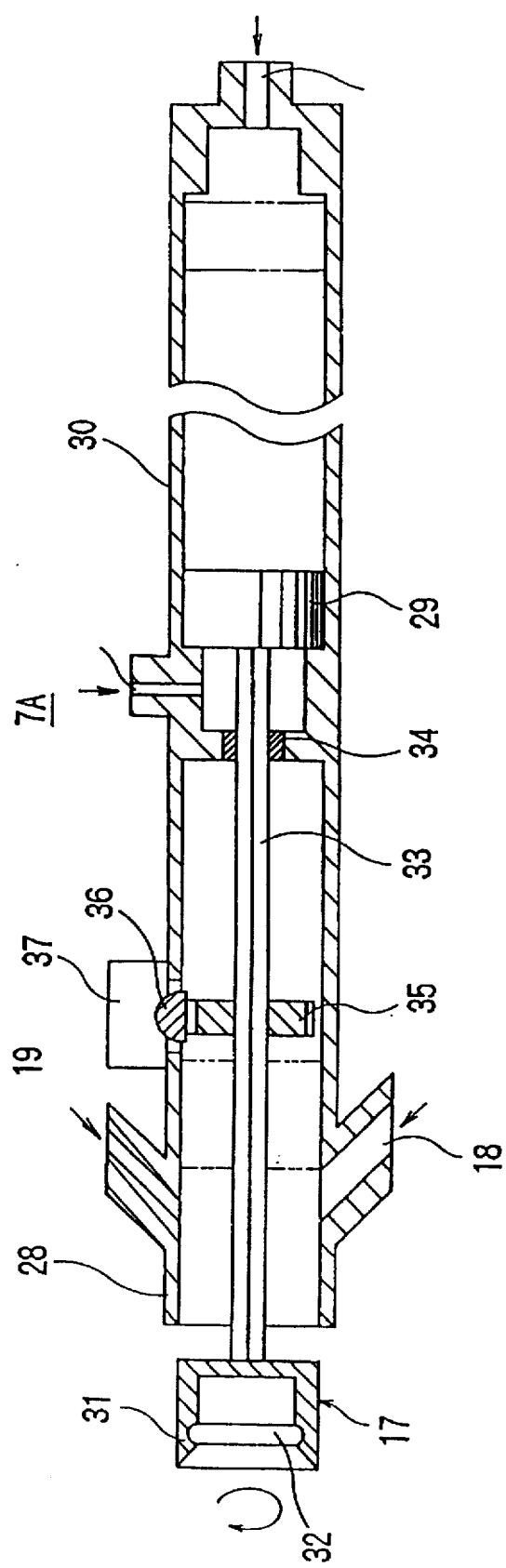
FIG. 6 is a sectional view showing another embodiment of the pre-expanded bead filler according to the present invention.

In lieu of the pre-expanded bead filler 7 described above, a different pre-expanded bead filler 7A can be used as described below. As illustrated in FIG. 6, this filler 7A comprises a plunger air cylinder 28 having a pre-expanded bead supply line 18 and a pressurized air supply line 19 for pressure-feeding pre-expanded beads, a plunger 17 which operates to open and close these lines 18 and 19 with its reciprocating motion, and a piston air cylinder 30 having a piston 29 which drives the plunger 17 back and forth.

The plunger 17 in this embodiment is, for example, of cup-like configuration having an outer diameter of 10 to 20 mm with an annular edge-cutter 31 formed on the circumference of its open end, and defines a resin receiving undercut area 32 surrounded by the edge of the cutter 31, to which area a portion the resin is forced to fit during blow-molding process. The bottom of the plunger 17 is provided with a shaft 33 having a polygonal cross section.

Alternatively, the resin receiving area 32 may be in the form of a pointed pin projecting from the center of the bottom of the plunger 17, the pin provided with a spiral conformation on its circumference.

The cutter plunger 17 and the piston 29 are connected with the shaft 33 having a polygonal cross section. The shaft 33 having a polygonal cross section is supported by a rotary seal member 34. The rotary seal member 34 allows reciprocating sliding of the shaft 33 and rotates in engagement with the shaft 33 when the shaft 33 rotates relative to the filler body. The rotary seal member 34 provides an air seal for the piston cylinder 30.

Around the shaft 33 is fit a pinion 35 which is engaged for rotation but slidable along the shaft 35. The pinion 35 is in mesh with a rack 36, and the rack 36 is moved back and forth by a driver air cylinder 37 in a direction perpendicular to the direction of the reciprocating movement of the shaft 33.

In the plunger air cylinder 28 is the cutter plunger 17 which is slidable and rotatable within the cylinder 28. The cutter plunger 17 operates to open and close the pre-expanded bead feed line 18 and the pressurized air supply line 19, and can protrude from the open end of plunger air cylinder 28 to make a bead filling hole 38 in the hollow member 4.

The process of producing a molded foam article with an integral skin using the pre-expanded bead filler 7A shown in FIG. 6 is described below.

Figure 7D:
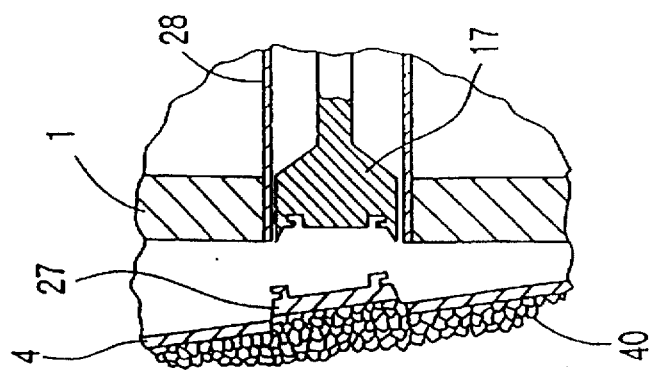
FIG. 7 is a flow chart illustrating the process for molding a molded foam with an integral skin using the pre-expanded bead filler shown in FIG. 6.
Figure 7C:
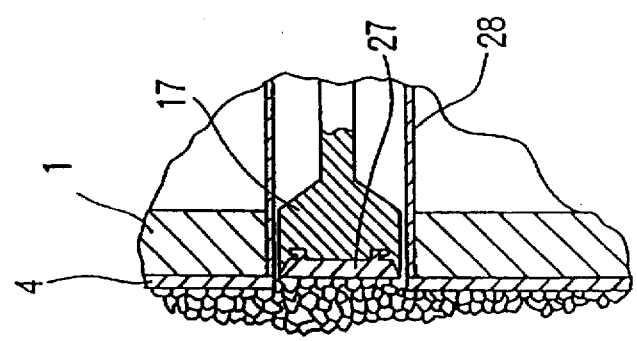
Figure 7B:
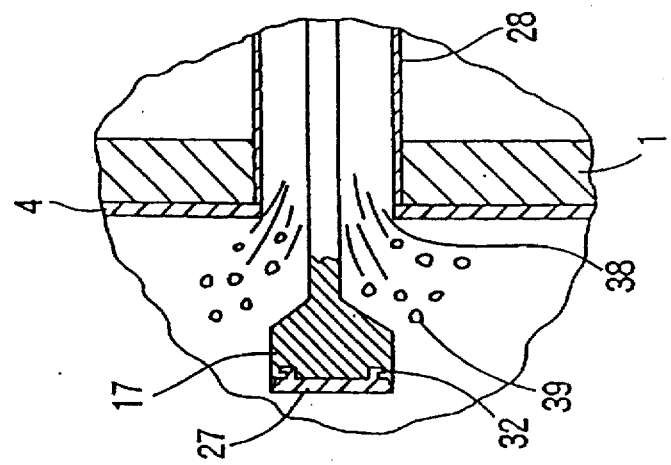
Figure 7A:
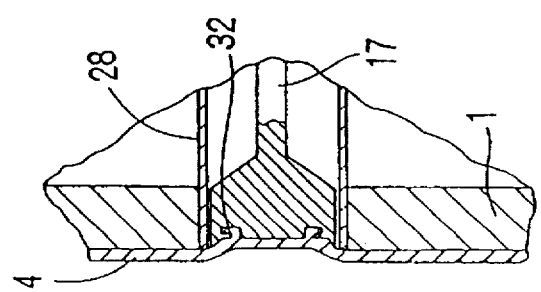

As shown in FIG. 7(A), the plunger air cylinder 28 is mounted on the blow-molding metal mold 1. The plunger air cylinder 28 is provided with the slidable and rotatable cutter plunger 17, the frontal end of the cutter plunger 17 being positioned somewhat recessed from the internal surface of the metal mold 1.

Thus, when a parison is blown to form a hollow member 4 in the metal mold 1, part of the parison is forced to fit to the resin receiving area 32 of the cutter plunger 17 by the blow pressure.

Then, upon the activation of the driver air cylinder 37, the rack 36 is advanced, which then rotates the pinion 35. The pinion 35 then rotates the shaft 33, which causes the rotation of the cutter plunger 17. When the piston 29 is advanced while rotating cutter plunger 17, the edge-cutter 31 makes the bead filling hole 38 as illustrated in FIGS. 7(A) to 7(B).

As it is in engagement with the resin receiving area 32, the chip 27 is retained by the cutter plunger 17. Then, with the cutter plunger 17 kept in the advanced position as shown in FIG. 7(B), the pre-expanded beads 39 is introduced to fill the hollow member.

Then, as shown in FIG. 7(C), the cutter plunger 17 is withdrawn to its initial position, and then hot steam is blown into the beads to cause further expansion and mutual fusion of the pre-expanded beads 39 to form a molded foam 40.

As the chip 27 has adhered to the molded foam 40 due to the thermal fusion of the pre-expanded beads 39, as illustrated in FIG. 7(C), the chip is removed with the molded article to which it adheres when the product is taken out from the opened mold.

In the above described process, it also is possible to open the lines 18 and 19 by sufficiently withdrawing the cutter plunger 17.

A method is described below in which the filler 7A can be applied to a hollow member (e.g. a flat article used as a closure) which is narrower than the diameter of the plunger 17 of the pre-expanded bead filler 7A.

Figure 8:
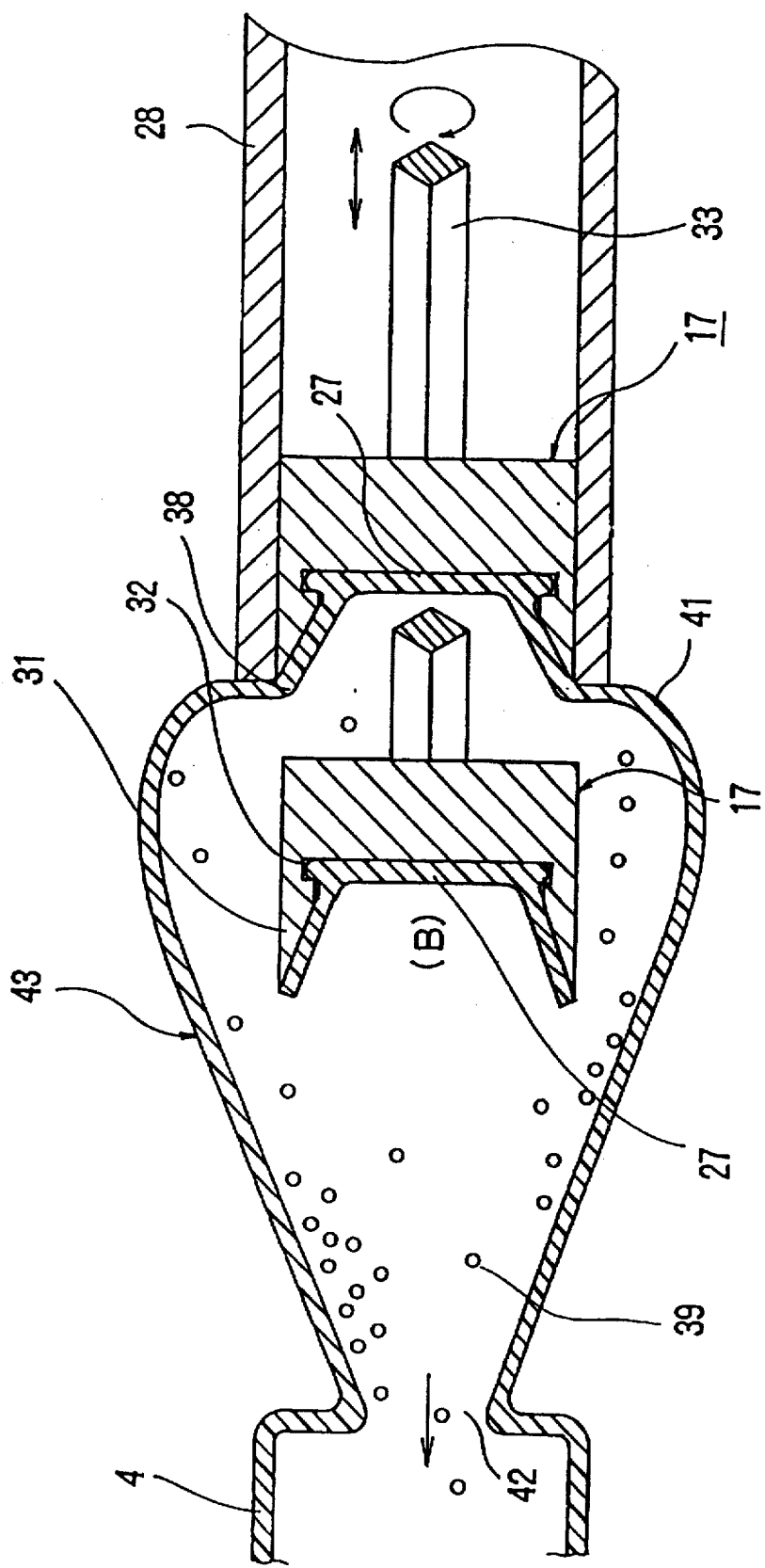
FIG. 8 is a schematic illustration of the actions of main parts of the pre-expanded bead filler shown in FIG. 6.

As illustrated in FIG. 8, a metal mold is used which is capable of forming the hollow member to have an swollen portion comprising a filler applying part 41 which is larger in diameter than the diameter of the cutter plunger 17 of the pre-expanded beads filler 7A and a communication port area 42 which is narrower in diameter than the diameter of the cutter plunger 17. As a matter of course, the orifice of the communication port area 42 is not necessarily circular. The pre-expanded beads filler 7A having the cutter plunger 17 with the cutter 31 and the resin receiving area 32 on its frontal end is mounted on the metal mold at the filler applying part 41 and then blow-molding of a parison is carried out. In the process, part of the parison is forced to fit to the resin receiving area 32 of the cutter plunger 17 by the blow pressure. Then, the cutter plunger 17 is rotated and advanced to make the bead filling hole 38. At this stage, the cutter plunger 17 retains the chip 27 cut out from the filler applying part 41 thereby to prevent the chip from plugging the communication port area 42. After the bead filling hole 38 is made, the cutter plunger 17 is advanced further as shown in FIG. 8(B), and pre-expanded beads are introduced by pressurized air through the space around the circumference of the cutter plunger 17 and into the hollow member 4 through the orifice of the communication port area 42.

Then, the cutter plunger 17 returns to its initial position, and hot steam is introduced into the beads to cause further expansion and mutual fusion of the pre-expanded beads to form a molded foam, and the swollen portion 43 is cut off to obtain the desired molded foam article with an integral skin.

The pre-expanded bead filler 7A as shown in FIGS. 6, 7, and 8 enables an efficient filling of pre-expanded beads without a chip 27 cut out by the cutter 31 left inside the hollow member 4.

Moreover, even in the production of a molded foam article which has a part thinner than the diameter of the plunger 17 of the pre-expanded bead filler 7A, the pre-expanded bead filler 7A can be applied to the thinner part to produce such an article.

INDUSTRIAL APPLICABILITY

By employing one and the same metal mold both for blow-molding and in-mold forming, the present invention enables a single step molding process and allows simplification of the equipment for the molding process, which allows lowered expenditure on the apparatus, and eventually serves to lower the cost of production of molded foam articles having an integral skin. Moreover, as it allows to make a filling hole in the hollow member to introduce pre-expanded beads therethrough, the present invention further enables a random choice of position for making a filling hole to introduce pre-expanded beads therethrough, thus allowing to avoid a trace of the filling hole left at a readily visible site, and, further, enables to obtain hinged molded foam articles with an integral skin and to use a multi-cavity mold for producing such articles.

What is claimed is:

1. A method of producing a molded foam article with an integral skin in a cavity of a mold having a parting line plane comprising the steps of:

blow-molding a parison suspended in a blow-molding metal mold to form a hollow member; cutting a hole in said hollow member in registry with a drivable cutter slidably and rotatably fitted within a bore which opens into the cavity of said mold at a location other than the parting line plane of said mold, said drivable cutter being a frontal part of a filler for pre-expanded thermoplastic resin beads and being extendable and retractable into and out of said mold cavity; injecting said pre-expanded resin beads into the cavity of said hollow member through said hole prior to cooling and solidification of said hollow member, and heating said resin beads by introducing hot steam into the cavity of said hollow member while temporarily closing said hole defined in said hollow member to cause the beads to expand further and fuse together to fill the cavity of said hollow member with a molded foam integral therewith.

2. The method according to claim 1, wherein said filler comprises:

a cylinder having a pre-expanded bead supply line, a pressurized air supply line for pressure-feed of pre-expanded beads, and a plunger, having a selected diameter and a frontal side, which plunger operates to open and close said supply lines by a back and forth motion thereof and which plunger has a cutter on the frontal side thereof having a resin receiving area surrounded by a cutting edge of the cutter, and an operative cylinder having a piston which causes said back and forth motion of said plunger.

3. The method of claim 2 further including the steps of:

blow-molding a parison to form a hollow member, advancing said plunger and making a bead filling hole on said blow-molded hollow member with the said cutter, further advancing said plunger with a chip resulting from the cutting of said hollow member being retained by said resin receiving area, and introducing pre-expanded beads into said hollow member, retracting said plunger with said chip retained by said resin receiving area, and heating said beads to produce a molded foam article with an integral skin.

4. The method according to claim 3, wherein said hollow member defines a swollen portion adjacent to said plunger, said swollen portion having a diameter larger than the diameter of said plunger, said swollen portion protruding from the body of said hollow member toward said plunger and communicating with the internal cavity of said hollow member through a communication port portion having an inner diameter smaller than the diameter of said plunger, whereby the introduction of pre-expanded beads into the hollow member is effected from said swollen portion and then through said communication port portion, and whereby said swollen portion is severed from the finished molded foam article.

* * * * *